United States Patent [19]

Oetiker

[11] Patent Number: 4,521,940
[45] Date of Patent: Jun. 11, 1985

[54] HOSE CLAMP

[76] Inventor: Hans Oetiker, Oberdorfstrasse 21, CH-8810 Horgen, Switzerland

[21] Appl. No.: 351,549

[22] Filed: Feb. 23, 1982

[51] Int. Cl.³ .............................................. F16L 33/04
[52] U.S. Cl. ....................................... 24/282; 24/279; 24/281; 24/20 LS
[58] Field of Search ................. 24/279, 280, 281, 282, 24/20 R, 20 CW, 20 EE, 20 S, 20 LS, 20 W, 24/17 A, 17 B, 271; 285/253; 138/99

[56] References Cited

U.S. PATENT DOCUMENTS

| 1,369,851 | 3/1921 | Swaidmark | 24/281 |
|---|---|---|---|
| 1,467,708 | 9/1923 | Cooper | 24/282 |
| 1,487,903 | 3/1924 | Vitek | 24/281 |
| 1,517,184 | 11/1924 | Barto et al. | 24/281 |
| 2,028,609 | 1/1936 | Irwin | 24/20 LS |
| 3,286,314 | 11/1966 | Oetiker | 24/20 CW |
| 4,299,102 | 11/1981 | Oetiker | 24/20 LS |
| 4,305,179 | 12/1981 | Sakurada | 24/20 CW |
| 4,365,393 | 12/1982 | Hauffe et al. | 138/99 |

FOREIGN PATENT DOCUMENTS

| 2456895 | 1/1981 | France | 285/253 |
|---|---|---|---|
| 230771 | 4/1944 | Switzerland | 24/282 |
| 4533 | 3/1892 | United Kingdom | 285/253 |
| 261549 | 11/1926 | United Kingdom | 24/282 |

Primary Examiner—Robert P. Swiatek
Assistant Examiner—John G. Weiss
Attorney, Agent, or Firm—Paul M. Craig, Jr.

[57] ABSTRACT

A hose clamp with a clamping band having two ends which are drawn together by a screw-type mechanism that includes a first band-tightening member secured near one band end, a second band-tightening member secured near the other band end, and a screw member for drawing together the first and second members; one of these band-tightening members is thereby securely held in place by an end portion of the clamping band externally bent back upon itself and secured to the underlying band portion while the other member is retained by a separate band part which is also externally bent back upon itself with the outer bent-back end portion secured to the underlying band portion of the separate part while the latter is secured to the clamping band itself; to assure a stepless internal configuration of the clamping surfaces of the clamping band, the inner end of the clamping band terminates in a tongue-like extension adapted to engage in a groove-like indentation provided near the other end of the clamping band.

22 Claims, 8 Drawing Figures

HOSE CLAMP

The present invention relates to a hose clamp, and more particularly to a screw-type, stepless hose clamp devoid of any discontinuities, offsets or gaps along the entire internal clamping surfaces thereof.

Various types of hose clamps are known in the prior art, as, for example, those utilizing so-called "Oetiker" ears which include one or more plastically deformable lug-shaped ears for tightening the clamp about the object to be fastened, as disclosed, for example, in my prior U.S. Pat. Nos. 2,614,304; 2,847,742 and 3,082,498. While hose clamps with so-called "Oetiker" ears have proved immensely successful due to the numerous advantages they offer, hose clamps with screw-type tightening devices can still be found in certain applications. Among the latter are, in particular, so-called worm-type clamps which can be found, for example, in the automotive industry where they are used for fastening various hoses, such as the radiator hoses of the cooling systems or the hoses of hydraulic systems.

FIG. 1 of the drawing shows such a prior art hose clamp which consists of an open clamping band generally designated by reference numeral 10 having an inner end 10a and an overlapping outer end 10b adapted to be tightened about the hose by a worm-drive that includes a bridging member generally designated by reference numeral 11 secured in its bottom portion 12 to the inner band end 10a by any appropriate means, for example, by a rivet-like connection. The bridging member 11 also forms in its upper portion a worm-receiving housing 13 of approximately inverted U-shaped cross section with outwardly extending legs integral with the side portions 14. The head 15 is integral with a rotatable part 16 that is provided on its external surfaces located inside the housing portion 13 with a helical worm surface (not shown) adapted to engage with more or less inclined teeth formed at least in the outer surface of the band end 10b. Apart from the fact that this type of clamp is very expensive to manufacture, it also entails serious drawbacks when used with the present-day, relatively thin plastic hoses made normally of relatively hard plastic material since the steps or offsets formed by the circumferential ends of the bridging member 11 with respect to the inner band end 10a and the step formed by the inner band end 10a with the overlying outer band end 10b represent areas of nontightness which are the more serious the harder and thinner the plastic material.

Toggle-type clamping devices as illustrated, for example, in my prior U.S. Pat. No. 3,475,793 not only entail similar disadvantages as the worm-type clamp of FIG. 1, but, in addition, also present the danger of inadvertent reopening by an accidental actuating of the toggle lever.

Another screw-type clamp is disclosed in my prior U.S. Pat. No. 3,579,754, in which one end of the clamping band is inserted through a slot in a closure part and then bent back upon itself on the inside while the other end is secured to the other closure part by hooks. However, this type of hose clamp entails similar disadvantages as the worm-type hose clamp of FIG. 1 in that it is relatively expensive to manufacture and provides offsets or steps which are likely to cause leakages with plastic hoses of the type frequently used at present.

Moreover, the bridging member 11 of the prior art worm-type device illustrated in FIG. 1 as well as the construction of the closure parts of the clamp illustrated in my prior U.S. Pat. No. 3,579,754 limit the minimum hose diameter with which the clamp can be used.

The present invention is therefore concerned with a hose clamp adapted to be tightened by a screw-type mechanism which effectively eliminates the aforementioned disadvantages and drawbacks encountered in the prior art.

More specifically, the present invention is concerned with a screw-type hose clamp that can be manufactured in a relatively inexpensive manner and which can also be assembled and installed relatively easily and quickly.

A further object of the present invention resides in a screw-type hose clamp which assures complete tightness with even the hardest plastic hose materials presently used by providing an internal clamping surface which is devoid of any discontinuities, offsets or steps.

Still a further object of the present invention resides in a screw-type hose clamp which can also be used with hoses of relatively small diameter.

These and other objects, features and advantages of the present invention will become more apparent from the following description when taken in connection with the accompanying drawing which shows, for purposes of illustration only, two embodiments in accordance with the present invention, and wherein.

Figure 1:
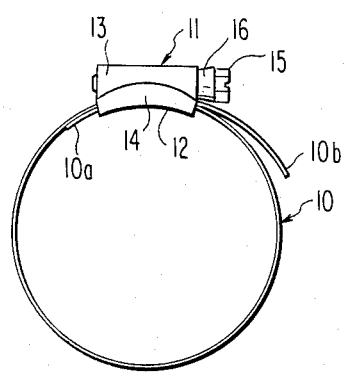
FIG. 1 is an elevational view of a prior art worm-type hose clamp.
Figure 2:
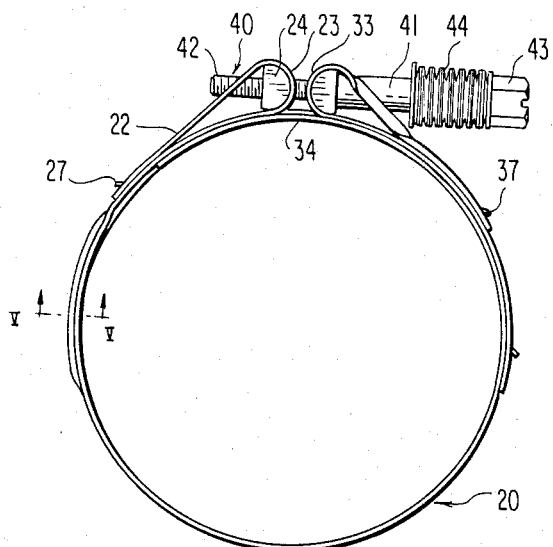
FIG. 2 is an elevational view of a screw-type hose clamp in accordance with the present invention.
Figure 3:
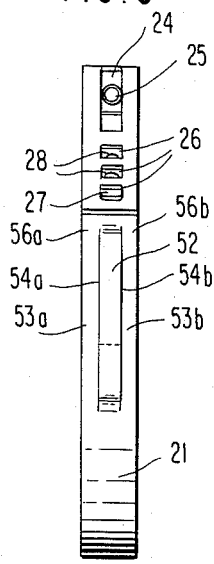
FIG. 3 is a left side elevational view of the hose clamp of FIG. 2.
Figure 4:
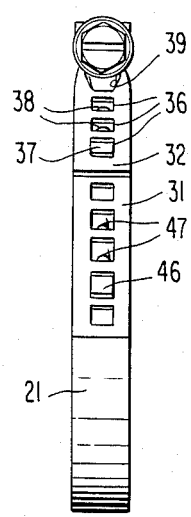
FIG. 4 is a right side elevational view of the hose clamp of FIG. 2.
Figure 5:
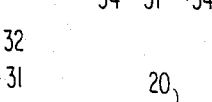
FIG. 5 is a cross-sectional view taken along line V—V of FIG. 2.

Referring now to the drawing wherein like reference numerals are used throughout the various views to designate like parts, and more particularly to FIGS. 2-6, reference numeral 20 generally designates the clamp in accordance with the present invention which includes a generally flat clamping band 21 having a bent-back outer clamping band end portion 22 forming a loop 23 for retaining a half-cylindrical, band-tightening member 24 of the mechanical tightening mechanism used in the present invention. The member 24 is provided with a threaded bore 25 for purposes to be explained hereinafter. Three or more rectangular apertures 26 are provided in the outer end portion 22, through which extend, respectively, a guide hook 27 and one or more support hooks 28, as more fully disclosed in my prior U.S. Pat. No. 4,299,012, issued Nov. 10, 1981. As disclosed in this patent, the arrangement of a guide hook 27 and of, for example, two support hooks 28 provides a very strong connection, thereby assuring an excellent holding ability of the clamp. Longitudinal slots 29 and 29' are futher provided in the outer bent-back band portion 22 and the inner underlying portion of the band 21 to provide greater bending ability of the band within this area.

Figure 6:
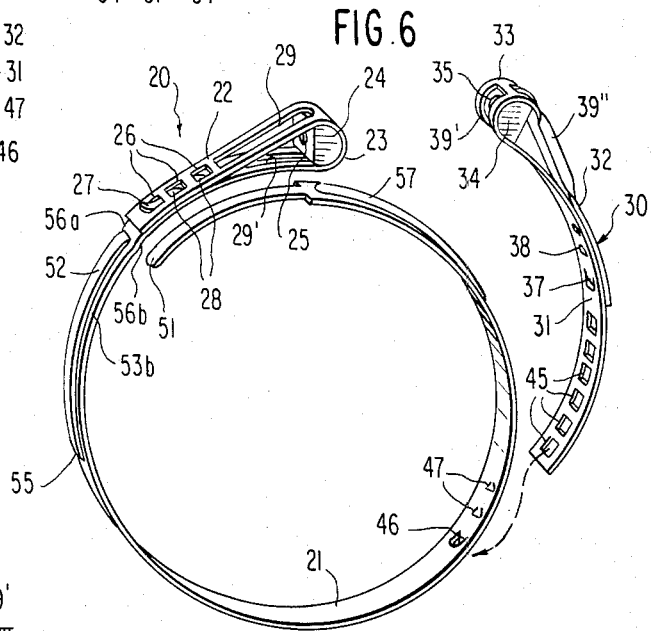
FIG. 6 is a perspective view of the hose clamp of FIGS. 2-4 with the separate clamping part not yet assembled onto the clamping band.

A separate clamping band part generally designated by reference numeral 30 includes an inner band portion 31 as well as a bent-back outer end portion 32 (FIG. 6), forming a loop 33 to retain the half-cylindrical, band-tightening member 34 which is provided with a non-threaded bore 35 for purposes also to be explained hereinafter. The outer band end portion 32 is provided with reactangular apertures 36 (FIG. 4), whereby one guide hook 37 and one or more support hooks, for example, two support hooks 38 as disclosed in my prior U.S. Pat. No. 4,299,012 are again adapted to engage with respective apertures 36. Longitudinal slots 39 (FIG. 4) and 39' (FIG. 5) are provided in the outer and inner band portions 32 and 31 to increase the bending ability of the band part within that area whereby, for purposes of providing a larger slot, the side portions of slot 39 are upset as indicated in FIG. 6 at 39''. A screw member generally designated by reference numeral 40 which serves to draw together the open ends of the clamping band 21, includes a threaded shank portion 42 and a screw head 43. A cylindrical sleeve 41 is mounted over the threaded shank portion 42 intermediate the band-tightening member 34 and the screw head 43, possibly by interposition of a spring 44 of any conventional construction, to facilitate actuation of the screw member 40 which can be of longer construction and thus greater accessibility of its screw head.

The inner band portion 31 of the separate clamping band part 30 is provided with rectangular apertures 45 for receiving therein one guide hook 46 and one or more, for example, two support hooks 47 punched out of the clamping band material 21 to thereby securely fasten the clamping band part 30 to the clamping band 21, as described above.

A tongue-like extension 51 is provided at the inner end of the clamping band 21 which is adapted to engage into a groove-like indentation or embossment 52 formed by a recessed bottom which leaves side portions 53a and 53b in the normal band configuration; the side portions 53a and 53b are thereby separated from the bottom 52 by longitudinal cuts 54a and 54b. A small step 55 (FIG. 6) extending outwardly from the normal contour of the clamping band 21 defines the beginning of the groove-like indentation 52 away from the loop 23, so that the clamping action is taken over within the area of the indentation 52 by the remaining clamping band portions 53a and 53b which are disposed in the normal band contour radially inwardly relative to the groove-like indentation. The end of the groove-like indentation 52 nearer the loop 23 is defined in effect by a small step 56a and 56b in each of the clamping band side portions. This arrangement assures a completely gap-free and stepless transition from the free end of the tongue-like extension into the inner circumferential band portion as more fully described in my copending application Ser. No. 036,979, filed on May 8, 1979 and entitled "Mechanical Lock for Clamps, now U.S. Pat. No. 4,315,348." An outwardly extending, centrally disposed reinforcing groove or embossment 57 may also be provided in the part of the clamping band 21 nearest the tongue-like extension 51 as shown in FIG. 6.

As can be readily seen, the various parts of the clamp in accordance with the present invention, illustrated in FIGS. 2-6 can be manufactured in a relatively simple and inexpensive manner. Assembly of the clamp is also simple in that it is only necessary to bend back the outer band portion 22 and engage the guide and support hooks 27 and 28 in apertures 26 to securely retain the band-tightening member 24. The separate clamping band part 30 together with the other band-tightening member 34 may be preassembled in a similar manner by engaging hooks 37 and 38 in apertures 36 and when thus preassembled can be securely attached to the clamping band 21 in a very simple manner by merely engaging the guide hook 46 and the support hooks 47 in those apertures 45 which fit closest. By providing more apertures 45 than necessary for the number of hooks 46, 47, it is thus possible to provide for a quick adjustment to the nearest dimension for a given hose. Thereafter, the screw 40 possibly together with the sleeve 41 and the spring 44 are assembled whereby the screw 40 extends freely through the nonthreaded bore 35 and engages with the threaded bore 25. The thus-assembled clamp is then mounted axially over the hose, and tightening of the screw 40 then will cause the two loops 23 and 33 to be drawn together, whence the clamp is tightened. Moreover, the present invention offers the advantage that the clamp can also be installed in a different manner. For example, after band-tightening member 24 is retained in place by securing the outer end portion 22 onto the underlying portion of the clamping band 21 in the manner described hereinabove, the clamp can be placed radially about the hose to be fastened, whereafter the pre-assembled separate clamping band part 30 can be assembled onto the clamping band 21 as described above.

Additionally, it is quite apparent that there are no parts such as the bridging member 11 of FIG. 1 which limit the minimum diameter for which the clamp can be used.

Figure 7:
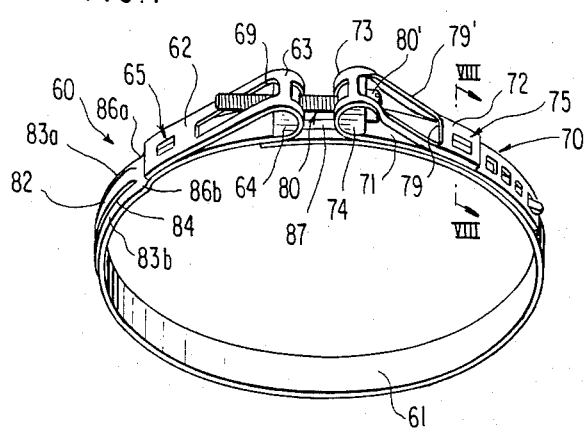
FIG. 7 is a perspective view of a modified embodiment of a screw-type hose clamp in accordance with the present invention.
Figure 8:
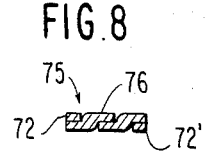
FIG. 8 is a cross-sectional view taken along line VIII—VIII of FIG. 7.

FIGS. 7 and 8 illustrate a modified embodiment of the present invention in which the clamp generally designated by reference numeral 60 again includes a generally flat clamping band 61 whose outer band end portion is bent back upon itself at 62 to form a loop 63 again retaining the half-cylindrical, band-tightening member 64 provided again with a threaded bore (not shown). However, differing from FIGS. 2-6, the free end of the outer bent-back portion 62 is not secured to the underlying band portion by guide and support hooks, but instead is connected thereto by a rivet-like connection as described more fully in my prior U.S. Pat. No. 3,286,314. A longitudinal slot 69 may again be provided in the outer bent-back band portion 62 to increase its flexibility.

The separate clamping band part generally designated by reference numeral 70 includes an inner band portion 71 and an outer bent-back band portion 72 defining a loop 73 for retention of the half-cylindrical, band-tightening member 74 provided with a non-threaded bore. A rivet-like connection generally designated by reference numeral 75 of the type more fully described in my prior U.S. Pat. No. 3,286,314, securely fastens the outer band portion 72 to the inner band portion 71. As described in my prior U.S. Pat. No. 3,286,314 and as shown in FIG. 8, a tab-like member 76 is punched out from the inner band portion which is extended through a correspondingly located slot in the outer band portion whereupon the tab-like member 76 is bent back into the plane of the outer band portion 72 to displace the corresponding part 72' (FIG. 8) of the outer band portion inwardly and thereby effect the rivet-like connection. A longitudinal slot 79 is again provided in the outer band portion 72 whose sides are upset as indicated at 79' to receive the screw head 80' of the screw member generally designated by reference numeral 80 which extends freely through the nonthreaded bore (not shown) in member 74 and threadably engages with the threaded bore in member 64.

To assure a stepless internal clamping surface, a groove-like indentation 82 is again provided which is separated by longitudinal cuts 84 from the lateral band portions 83a and 83b which remain in the normal contour of the clamping band. As in the embodiment of FIGS. 2-6, a small step (not shown) displacing the bottom of the groove-like indentation 82 out of the normal band configuration defines the commencement of the groove-like indentation while small steps 86a and 86b in lateral band portions 83a and 83b again define the end of the groove-like indentation. A reinforcing groove 87 which may also be radially inwardly directed is provided within the area of the clamping band adjoining the tongue-like extension (not shown) which is adapted to engage into the groove-like indentation 82.

While I have shown and described only two embodiments in accordance with the present invention, it is understood that the same is not limited thereto but is susceptible of numerous changes and modifications as known to those skilled in the art. For example, instead of a screw head with a rectangular slot, a Phillips-type screw may be used, or a hexagonal screw head. Moreover, the washer 41 and springs 44 which also may be merely in the form of approximately shaped washers or in the shape of other types of springs, such as wire springs, may be eliminated from FIG. 2 or may be added in FIG. 7. Furthermore, a rivet-like connection as disclosed in my U.S. Pat. No. 3,286,314 may be substituted, where desired, for the connection using guide and support hooks as disclosed in my U.S. Pat. No. 4,299,012, and vice versa. Thus, I do not wish to be limited to the details shown and described herein, but intend to cover all such changes and modifications as are encompassed by the scope of the appended claims.

I claim:

1. A clamp which comprises a clamping band having two ends and threaded means for tightening the clamping band about an object to be fastened, said threaded means including a first member retained near one band end, a second member retained near the other band end, said first and second members being each provided with through-bores, and a screw member having a screw head larger than the through-bore of the first member and a threaded portion adapted to extend at least through the through-bore of said first member and operable to tighten the clamp by drawing together the first and second members and thereby reduce the diametric dimension of the clamp, characterized in that one band end extends beyond the area of the threaded means underneath the overlapping band portion of the other band end to cover the resulting gap underneath the threaded means and thereby prevent the bulging-out of the object to be fastened into the gap, and further means within the area of overlap between said one band end and the otherlapping band portion near the other band end to provide a substantially stepless transition in the circumferential direction between said one band end and the adjoining band portion, and the first and second members being of at least approximately part-cylindrical shape rotatably retained in pocket-like loops of at least approximately complementary, part-cylindrical shape to enable positional adjustment of said members during tightening of the clamp.

2. A clamp according to claim 1, characterized in that the further means includes a circumferentially extending groove-like indentation in the other band end which is formed by a pressed-out portion generally centrally disposed in said other band end to receive in said groove-like indentation a tongue-like portion provided at said one band end in extension of the clamping band itself.

3. A clamp in which the clamping band is of relatively flat band material according to claim 2, characterized in that a small step extending outwardly from the normal contour of the clamping band defines the beginning of said groove-like indentation away from said outer band end, thereby leaving along each side of said groove-like indentation a lateral band portion disposed radially inwardly relative to the bottom of said groove-like indentation, and in that a small outwardly extending step in each of said lateral band portions defines in effect the end of said groove-like indentation nearer said one band end.

4. A clamp according to claim 2 or 3, characterized in that cuts in the clamping band separate the bottom of the groove-like indentation from the lateral portions of the clamping band.

5. A clamp according to any one of claims 1, 2, or 3, wherein said first and second members are retained by band portions externally bent back upon themselves to form the pocket-like loops receiving said first and second members, the bent-back portions being secured to respective underlying band portions, and said further means being located in the overlapping band portion further away in the circumferential direction from said other band end than the location where the bent-back portion thereof is secured to its corresponding underlying portion.

6. A clamp according to claim 5, characterized in that one of said bent-back band portions is formed directly by the other band end of the clamping band.

7. A clamp according to claim 5, characterized by spring means between the screw head and the first member.

8. A clamp according to claim 5, characterized in that said first and second members are approximately of part-cylindrical shape, said first member being provided with a nonthreaded through-bore while said second member is provided with a threaded through-bore, with which the threaded portion of said screw member is operable to engage.

9. A clamp which comprises a clamping band having two ends and threaded means for tightening the clamping band about an object to be fastened, said threaded means including a first member retained near one band end, a second member retained near the other band end, said first and second members being each provided with through-bores, and a screw member having a screw head larger than the through-bore of the first member and a threaded portion adapted to extend at least through the through-bore of said first member and operable to tighten the clamp by drawing together the first and second members and thereby reduce the diametric dimension of the clamp, characterized in that one band end extends beyond the area of the threaded means underneath the overlapping other band end to cover the gap underneath the threaded means and thereby prevent bulging of the object to be fastened into the gap, and further means within the area of overlap of said one band end with said other band end to provide a substantially stepless transition in the circumferential direction between said one band end and the adjoining band portion, said first and second members being of at least partially cylindrical shape and being retained by band portions externally bent back upon themselves to form at least partially cylindrically shaped pocket-like loops rotatably receiving said first and second members to permit positional adjustment during tightening thereof, the bent-back band portions being secured to respective underlying band portions, one of said bent-back band portions being formed directly by the other band end of the clamping band, and the other of said bent-back band portions being formed by a separate band part bent back upon self whose outer bent-back band portion is secured to the underlying inner portion of the separate clamping band part while said inner portion, in turn, is secured to the underlying portion of the clamping band.

10. A clamp according to claim 9, wherein at least one of the two bent-back band portions is secured to the underlying band portion by a rivet-like connection.

11. A clamp according to claim 10, wherein said at least one bent-back band portion is the one formed directly by a band end of the clamping band.

12. A clamp according to claim 9, characterized in that each bent-back band portion is secured to the respective underlying band portion by a rivet-like connection.

13. A clamp according to claim 9, characterized in that at least the inner portion of the separate band part is secured to the underlying portion of the clamping band by hook means extending outwardly from said last-mentioned underlying portion of the clamping band and engaging in corresponding apertures provided in said inner portion.

14. A clamp according to claim 13, characterized in that the outer portion of the separate band part is secured to the inner portion thereof by hook means extending outwardly from said inner portion and engaging in corresponding apertures of the outer portion.

15. A clamp according to claim 14, wherein said hook means includes at least one support hook and one guide hook within each area where two band portions are secured to each other.

16. A clamp according to claim 9, characterized in that at least the outer portion of the separate band part is secured to the inner portion thereof by hook means extending outwardly from said inner portion and engaging in corresponding apertures of the outer portion.

17. A clamp according to claim 16, wherein said hook means include at least one support hook and one guide hook within each area where two band portions are secured to each other.

18. A clamp which comprises a clamping band having two ends and threaded means for tightening the clamping band about an object to be fastened, said threaded means including a first member retained near one band end, a second member retained near the other band end, said first and second members being each provided with through-bores, and a screw member having a screw head larger than the through-bore of the first member and a threaded portion adapted to extend at least through the through-bore of said first member and operable to tighten the clamp by drawing together the first and second members and thereby reduce the diametric dimension of the clamp, characterized in that one band end extends beyond the area of the threaded means underneath the overlapping band end to cover the gap underneath the threaded means and thereby prevent bulging of the object to be fastened into the gap, said first and second members being at least of approximately part-cylindrical shape retained in pocket-like loops of substantially complementary, at least approximately part-cylindrical shape and formed by band portions externally bent-back upon themselves to permit postional adjustment of said first and second members during tightening of the clamp, spring means between the screw head and the first member for automatically compensating for thermal expansions, and further means within the area of overlap of said band end with the overlapping band portion near the other band end to provide a substantially stepless transition in the circumferential direction between said one band end and the adjoining band portion.

19. A clamp according to claim 18, wherein the further means includes a circumferentially extending groove-like indentation in the overlapping band portion which is formed by a pressed-out portion generally centrally disposed in said other band end to receive in said groove-like indentation a tongue-like portion provided at said one band end, a small step extending outwardly from the normal contour of the clamping band defining the beginning of said groove-like indentation away from said other band end, thereby leaving along each side of said groove-like indentation a lateral band portion disposed radially inwardly relative to the bottom of said groove-like indentation, and a small step extending outwardly in each of said lateral band portions which define in effect the end of said groove-like indentation nearer said one band end.

20. A clamp according to claim 18, wherein said further means includes a circumferentially extending groove-like indentation in the overlapping band portion with an outwardly extending step in the overlapping band portion near the end of the groove-like indentation nearer said other band end.

21. A clamp according to claim 19, wherein said further means is spaced from said other band end a distance at least equal to the location where the bent-back band portion forming part of said other band end is secured to the band portion disposed directly therebelow.

22. A clamp according to claim 21, wherein the circumferentially extending groove-like indentation in the overlapping band portion is formed by a pressed-out portion generally centrally disposed near siad other band end to receive in said groove-like indentation a tongue-like portion provided in continuation of said one band end, a small step extending outwardly from the normal controur of the clamping band defining the beginning of said groove-like indentation away from said other band end, thereby leaving along each side of said groove-like indentation a lateral band portion disposed radially inwardly relative to the bottom of said groove-like indentation, and a small step extending outwardly in each of said lateral band portions which define in effect the end of said groove-like indentation nearer said one band end.

* * * * *

UNITED STATES PATENT AND TRADEMARK OFFICE
CERTIFICATE OF CORRECTION

PATENT NO. : 4,521,940
DATED : June 11, 1985
INVENTOR(S) : Hans Oetiker

It is certified that error appears in the above-identified patent and that said Letters Patent is hereby corrected as shown below:

Column 3,

Line 13, "(FIG.5)" should be --(FIG.6)--.

Signed and Sealed this

Fifth Day of November 1985

[SEAL]

Attest:

DONALD J. QUIGG

Attesting Officer

Commissioner of Patents and Trademarks